July 2, 1935.                J. H. POWERS                2,006,931
                          ELECTRICAL INSULATOR
                          Filed March 1, 1934
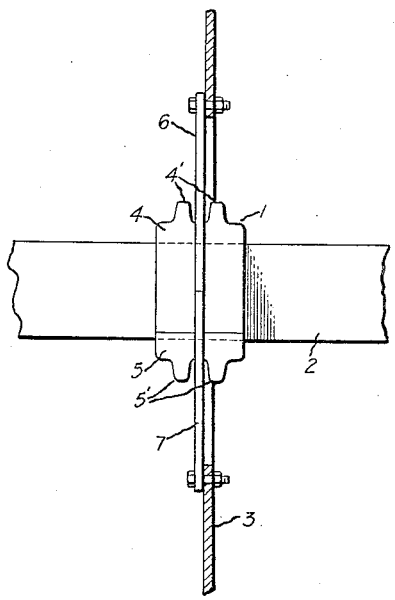
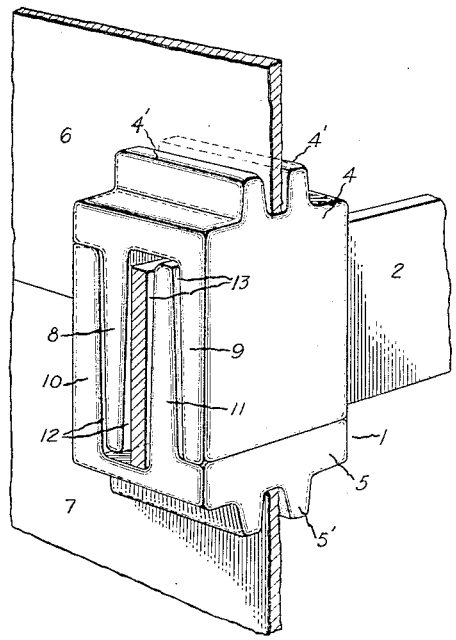
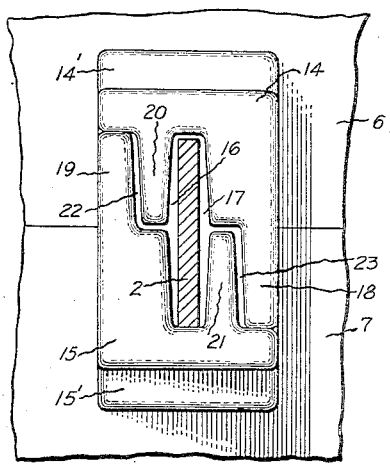
Inventor:
James H. Powers,
by Harry E. Dunham
His Attorney Patented July 2, 1935

2,006,931

UNITED STATES PATENT OFFICE 2,006,931

ELECTRICAL INSULATOR

James H. Powers, Yeadon, Pa., assignor to General Electric Company, a corporation of New York.

Application March 1, 1934, Serial No. 713,495

5 Claims. (Cl. 173—314)

My invention relates to electrical insulators, more particularly to split insulators having complementary portions for mounting and positioning high tension electrical conductors as busbars and the like.

High tension busbars as employed, for example, in power distribution circuits require not only rugged mechanical mountings to withstand short circuit stresses but also highly efficient electrical insulators to insulate the busbars with respect to ground and other circuits. This is particularly the case in metal enclosed switchgear wherein grounded sheet metal is employed for housing and supporting the busbars and associated apparatus. Accordingly, flashover and failure of an insulator may result if the creepage paths between the high tension busbars and ground are of insufficient length or subject to the accumulation of moisture.

The principal object of my invention is the provision of an improved high tension insulator of the aforesaid type which shall have comparatively long and well ventilated creepage paths between the busbar and ground, and which shall be simple and rugged in construction.

My invention will be more fully set forth in the following description referring to the accompanying drawing, and the features of novelty which characterize my invention will be pointed out with particularity in the claims annexed to and forming a part of this specification.

Referring more particularly to the drawing, Fig. 1 is a fragmentary view of a section of busbar supported transversely of a metallic wall by an insulator of the type embodying the present invention; Fig. 2 is an enlarged detailed view in perspective of the insulator and associated structure shown in Fig. 1, and Fig. 3 is an end view of a modified form of my invention.

Fig. 1 illustrates a combined insulating mounting and bushing 1 for leading a high tension busbar 2 through a metallic wall 3. The busbar 2 in the present instance comprises a flat copper strip, rectangular in cross section as illustrated in Fig. 2, and may be either bare, as illustrated, or provided with a molded insulating coating for additional protection to station attendants. The insulator 1 is of the so-called split type and is composed of a pair of complementary portions 4 and 5 which fit around and enclose the busbar in a manner presently described. The portions 4 and 5 are provided with flanges 4' and 5', respectively, which form grooves for coacting with transversely positioned metallic plates 6 and 7 detachably secured to the wall 3, as clearly illustrated by Fig. 1. The plates 6 and 7 are in edgewise abutting relation and have notches so that they fit closely around the insulator 1 which serves as a through-bushing for the busbar 2.

Referring more particularly to Fig. 2, each of the insulating portions 4 and 5 is provided with a pair of flange-like extensions arranged to engage and loosely interlock with the complementary insulating portion so that the busbar is not only completely surrounded by the insulating bushing but is separated from the grounded metallic wall portions 6 and 7 by comparatively long creepage paths which are open for the free circulation of air. Accordingly, the electrical efficiency of the insulator is increased not only by the long creepage paths but also by the fact that accumulation of moisture on the insulator surface defining said paths is substantially precluded.

To this end the insulating portion 4 is provided with flange-like extensions or legs 8 and 9 and the portion 5 is provided with similar extensions or legs 10 and 11 arranged so that outer legs 9 and 10 of the portions 4 and 5, respectively, abut the complementary insulating portions, and the legs 8 and 11 are spaced a short distance with respect to the complementary insulating portions. Accordingly, the legs 9 and 10 form two sides of the insulator 1. Likewise, as clearly illustrated by Fig 2, the legs 8, 9, 10 and 11 are so proportioned that when the insulating portions are interlocked, air passages 12 and 13 are formed along opposite sides of the legs 8 and 11 and the busbar 2 which is positioned between said legs.

The creepage paths between the busbar and metal wall portions 6 and 7 are defined by the surfaces of the insulator between the points of contact between busbar and insulator, and insulator and wall. It will, therefore, be noted that free circulation of air through the insulator along opposite sides of the busbar 2 and along the comparatively long creepage paths defined by the legs 8 and 11 is permitted. Accordingly the partially enclosed creepage paths above described are properly ventilated so as to prevent accumulation of moisture in the insulator.

The interlocking portions of the insulator illustrated by Fig. 1 likewise provide a rugged through-bushing for the busbar 2 with respect to the metallic wall. The portions of the insulators are composed of insulating material of suitable characteristics, a strong, glazed ceramic material being illustrated, by way of example, in the present instance.

Fig. 3 illustrates a slightly modified form of my invention wherein the insulating portions 14 and 15 are provided with interlocking legs which provide air passages 16 and 17 at opposite sides of the busbar 2, while changing somewhat the shape of the creepage paths between the busbar and metallic wall. The legs 18 and 19 of the portions 14 and 15, respectively, abut the complementary insulating portions, whereas the comparatively short legs 20 and 21 are spaced therefrom generally in the manner above described so as to form air passages 22 and 23 along the insulator legs. The insulator illustrated by Fig. 3 is secured as by flanges 14' and 15' to sectional wall portions 6 and 7 in the manner above described.

It should be noted that an insulator embodying my invention may be completely removed or replaced with respect to the busbar without disturbing the latter. This is effected merely by unbolting the two-section mounting plate 6—7 and removing the same after which the complementary portions of the insulator 1 are slipped off opposite sides of the busbar.

I have found that at high voltages, a corona discharge appears on busbars having a molded insulation coating which tends to break down the insulation. This corona effect, as well as in the case of bare busbars, may be greatly reduced by painting the inside of the insulator 1 surrounding the busbar with conductive material as graphite or aluminum for example. Likewise the insulation coating surrounded by the insulator 1 may similarly be painted for decreasing electric stresses.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. An insulator for a high tension conductor comprising two complementary portions enclosing said conductor, each of said portions having two interlocking flange-like legs, one of said legs abutting the coacting portion and the other spaced from said portion.

2. A split insulator for enclosing a high tension conductor comprising two complementary portions, each of said portions having an externally disposed flange-like leg abutting the coacting portion and an internally disposed leg spaced from said portion and busbar to form air passages through said insulator.

3. A split insulator for enclosing a high tension busbar comprising two complementary portions, each of said portions having two flange-like legs, one of said legs abutting the coacting portion and the other of said legs spaced from said portion and from said busbar so as to form air passages through said split insulator along opposite sides of said busbar and along the interlocking legs of said complementary portions.

4. A split insulator for a high tension busbar comprising two complementary portions enclosing said busbar, each of said portions having a flange-like leg forming an outer side of said insulator and a second flange-like leg spaced from an outer edge of said insulator and parallel with respect to said first-named leg, said busbar positioned between said second-named legs and spaced therefrom to form air passages through said insulator.

5. A split insulator for a high tension busbar comprising a pair of complementary portions enclosing said busbar, each of said portions having a flange-like leg abutting the coacting portion and forming an outer side of said insulator, and a second flange-like leg spaced from and parallel to said first-named leg, said last-named legs being spaced with respect to the coacting portion and said busbar to form air passages axially through said insulator along opposite sides of said busbar and said second-named legs.

JAMES H. POWERS.